Figure 1:
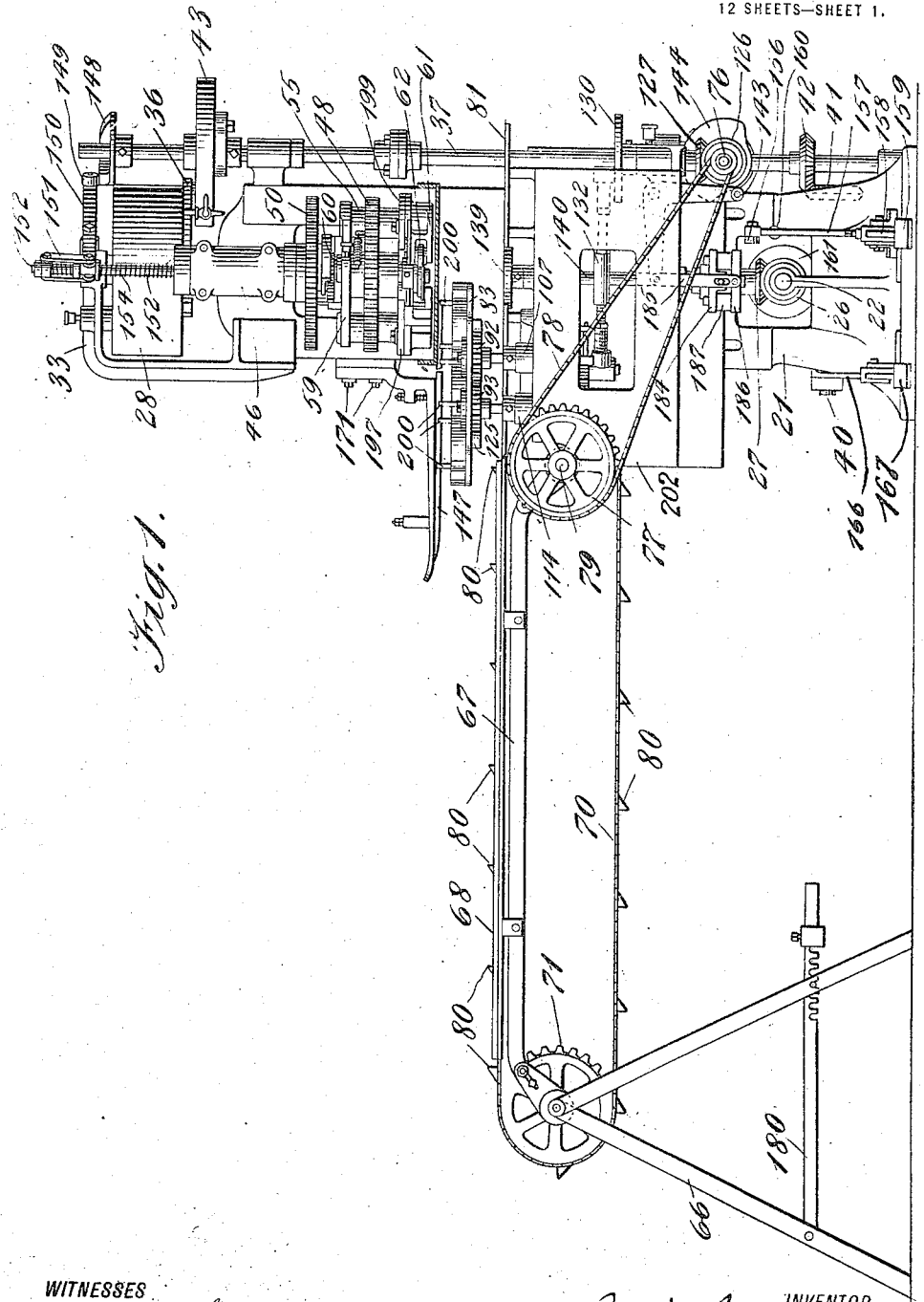

J. BRENZINGER.
CAN HEADING MACHINE.
APPLICATION FILED MAR. 24, 1909.

1,167,345.

Patented Jan. 4, 1916.
12 SHEETS—SHEET 2.

J. BRENZINGER.
CAN HEADING MACHINE.
APPLICATION FILED MAR. 24, 1909.

1,167,345.

Patented Jan. 4, 1916.
12 SHEETS—SHEET 3.

J. BRENZINGER.
CAN HEADING MACHINE.
APPLICATION FILED MAR. 24, 1909.

1,167,345.

Patented Jan. 4, 1916.
12 SHEETS—SHEET 5.

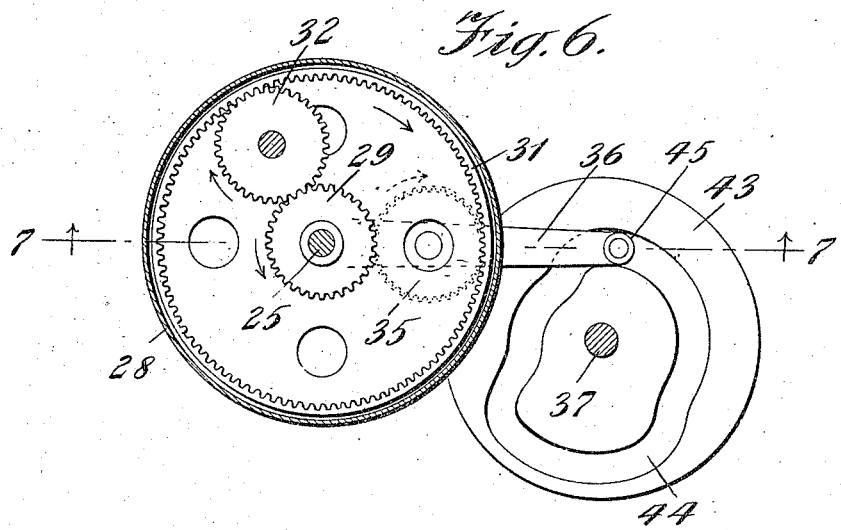
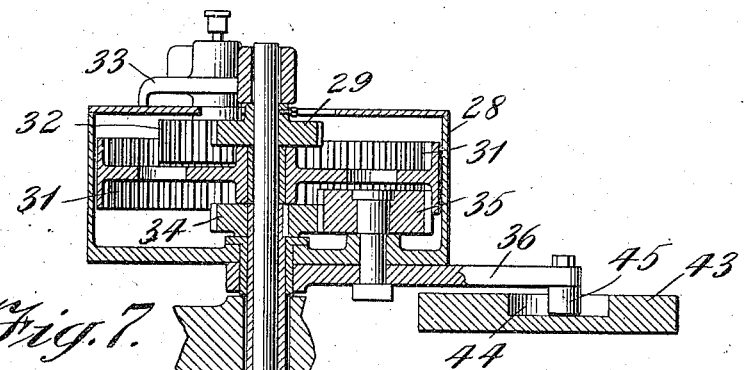
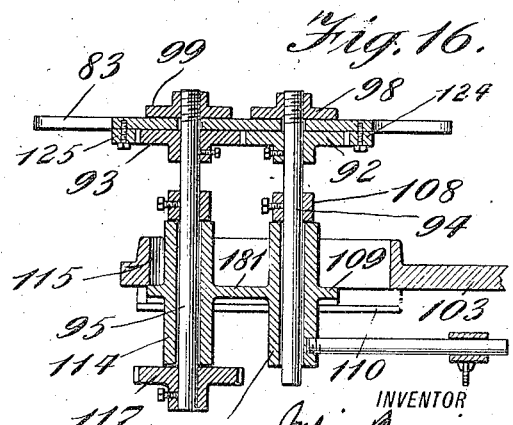

J. BRENZINGER.
CAN HEADING MACHINE.
APPLICATION FILED MAR. 24, 1909.
1,167,345.
Patented Jan. 4, 1916.
12 SHEETS—SHEET 7.
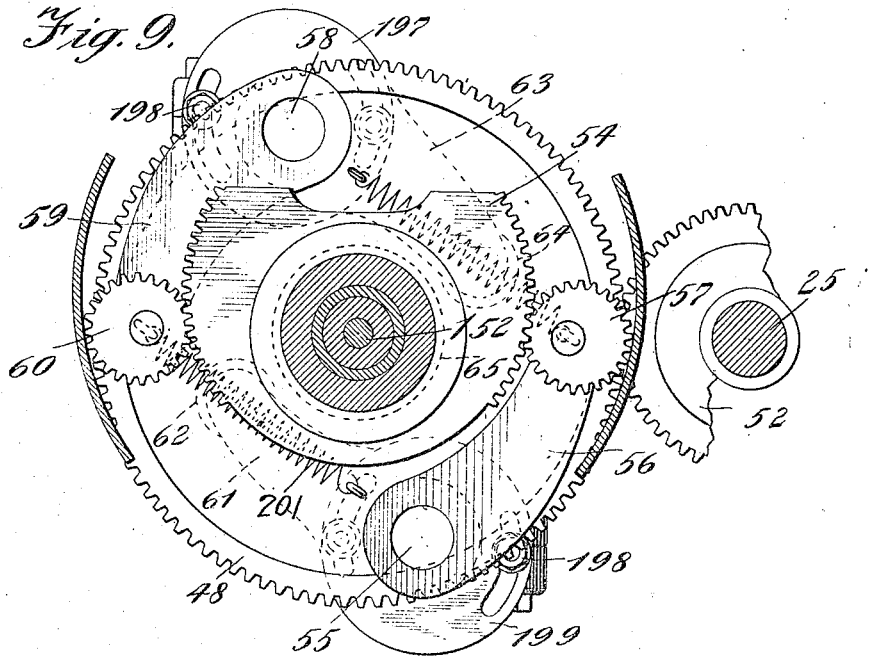
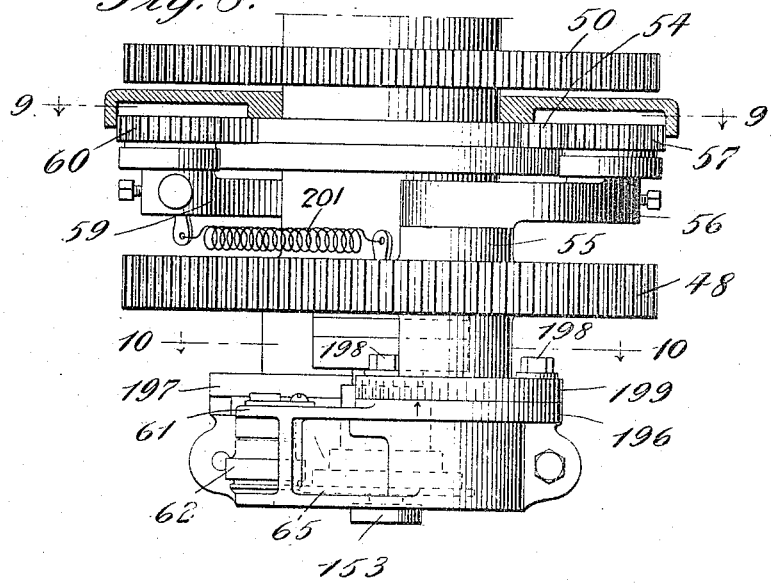
WITNESSES
INVENTOR
Julius Brenzinger
BY
ATTORNEY

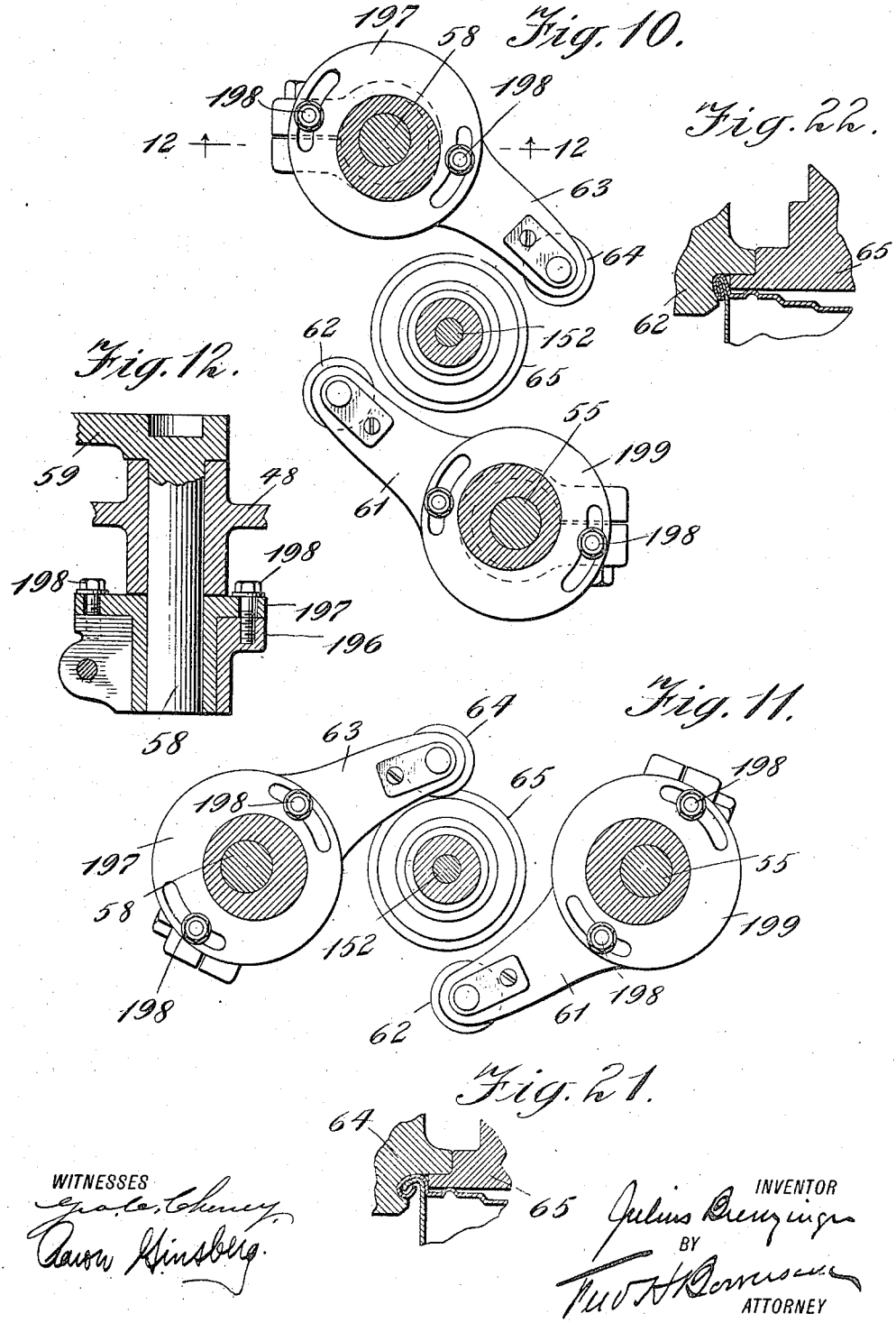

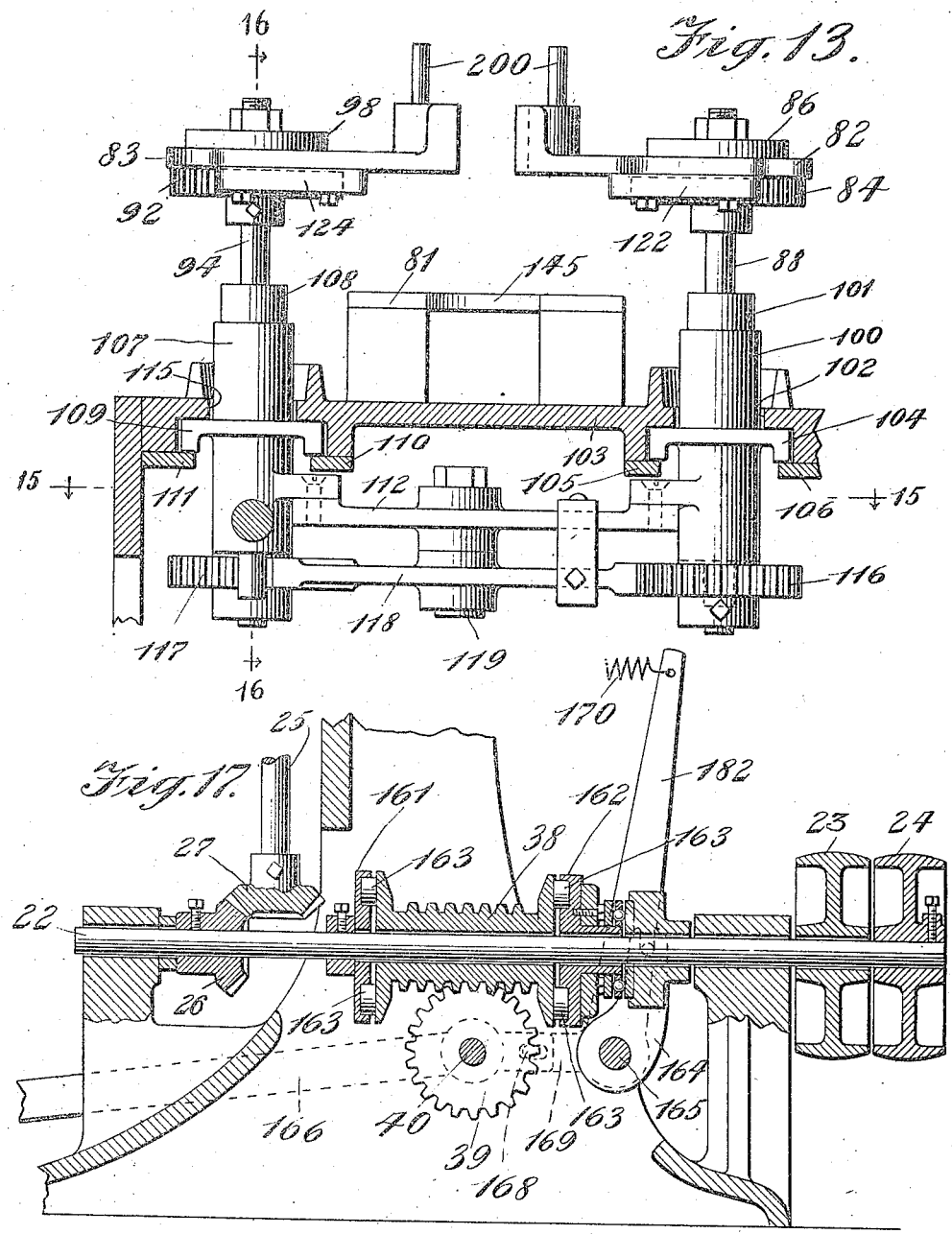

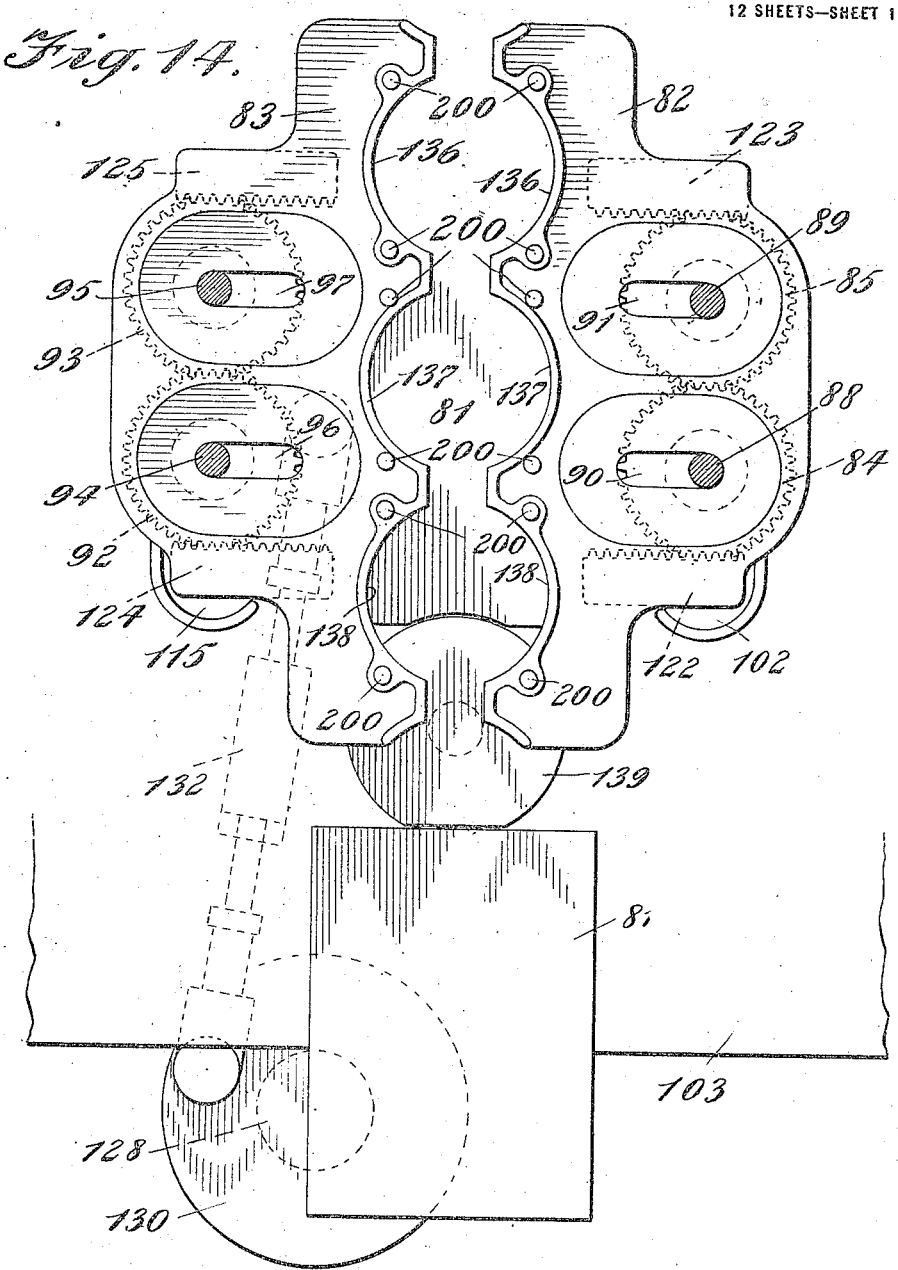

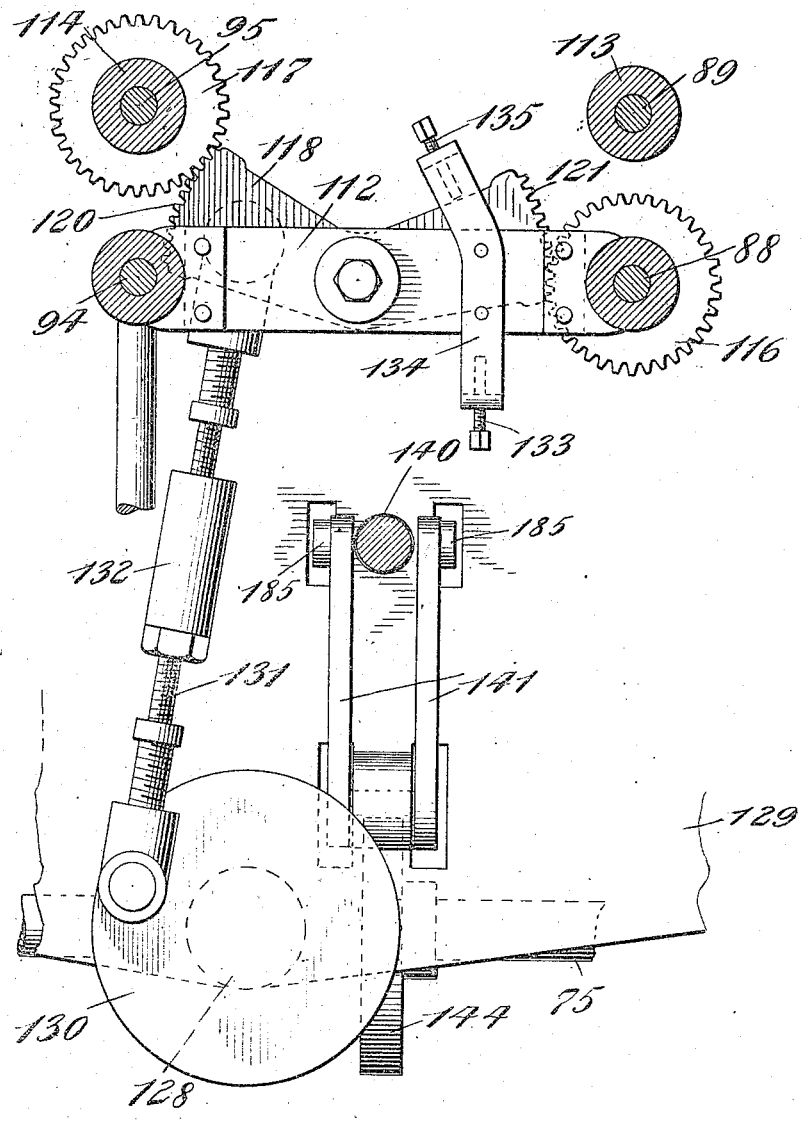

J. BRENZINGER.
CAN HEADING MACHINE.
APPLICATION FILED MAR. 24, 1909.

1,167,345.

Patented Jan. 4, 1916.
12 SHEETS—SHEET 12.

WITNESSES

INVENTOR
Julius Brenzinger
BY
ATTORNEY

UNITED STATES PATENT OFFICE.

JULIUS BRENZINGER, OF MOUNT VERNON, NEW YORK, ASSIGNOR TO THE MAX AMS MACHINE COMPANY, OF BRIDGEPORT, CONNECTICUT, A CORPORATION OF NEW YORK.

CAN-HEADING MACHINE.

1,167,345. Specification of Letters Patent. Patented Jan. 4, 1916.

Application filed March 24, 1909. Serial No. 485,451.

*To all whom it may concern:*

Be it known that I, JULIUS BRENZINGER, citizen of the United States, residing at Mount Vernon, in the county of Westchester and State of New York, have invented certain new and useful Improvements in Can-Heading Machines, of which the following is a specification.

This invention relates to machines for securing the tops and bottoms to the body portions of sheet metal containers, commonly known as tin cans, by what is known as the double seaming process.

There are many well-known types of machines for double-seaming the tops and bottoms to the body portions of cans, which insure a rigid and tight joint. With most known forms of such machines, however, it is necessary that the unseamed but assembled parts of the can be adjusted in the machine by hand and similarly removed therefrom after the seaming operation.

The principal difficulties attendant upon an effort to provide automatic feeding mechanism in connection with a can heading machine are, first, the necessity for a degree of perfection of adjustment of the can parts in the machine which cannot readily be secured by any known form of mechanical feeding means; second, the undesirable effects of the ordinary step-by-step movement of the can carrier or conveyer, which is jerky and tends not only to disturb the necessary adjustment between the can body and its superposed top, but is also likely to cause the spilling of more or less of the contents of the can which is being headed, and, third, that of providing such connection between the delivery and the seaming mechanism that the former may be checked and the latter simultaneously rendered inoperative, in case of trouble or accident, without stopping the movement of other parts of the machine. Furthermore, it is well known in this art that the double seam is generally the result of two operations, usually performed by two seaming rollers each of which is either revolved around the can body, which with its superposed head is supported by a suitable chuck, or which are rotated against the rotating can body. One of these rollers first operates to turn down the superposed flanges, after which this roller is withdrawn and the other roller is brought into play to compress the folded metal layers into a tight seam or joint. Generally, this interchange of rollers is the result of a manual operation properly timed by the operator in charge of the machine, a process which undoubtedly necessitates loss of time and, therefore, materially curtails the capacity of the machine.

The principal objects of the present invention are, first, the provision of a can heading machine which includes an automatic feeding device which is dependable in operation and which will properly deliver the assembled parts of the can to the seaming mechanism without disturbing the relative positions of the parts or loss of any portion of the contents of the can; second, the provision of a machine having seaming mechanisms which will automatically receive the assembled can parts from the feeding device and subject the same to the alternate operations of the two seaming rollers; third, the provision of a machine of this character having means both for quickly shutting off the power and stopping the entire machine, and for stopping operations of the feeding device and simultaneously rendering inoperative the revolutions of the seaming rollers, and, fourth, the provision of a machine of this character which may be quickly and readily adjusted for the heading of cans of various sizes, and which will be otherwise comparatively simple in construction and dependable in operation.

My invention will be more readily understood by reference to the accompanying drawings, forming a part of this specification, in which—

Figure 2:
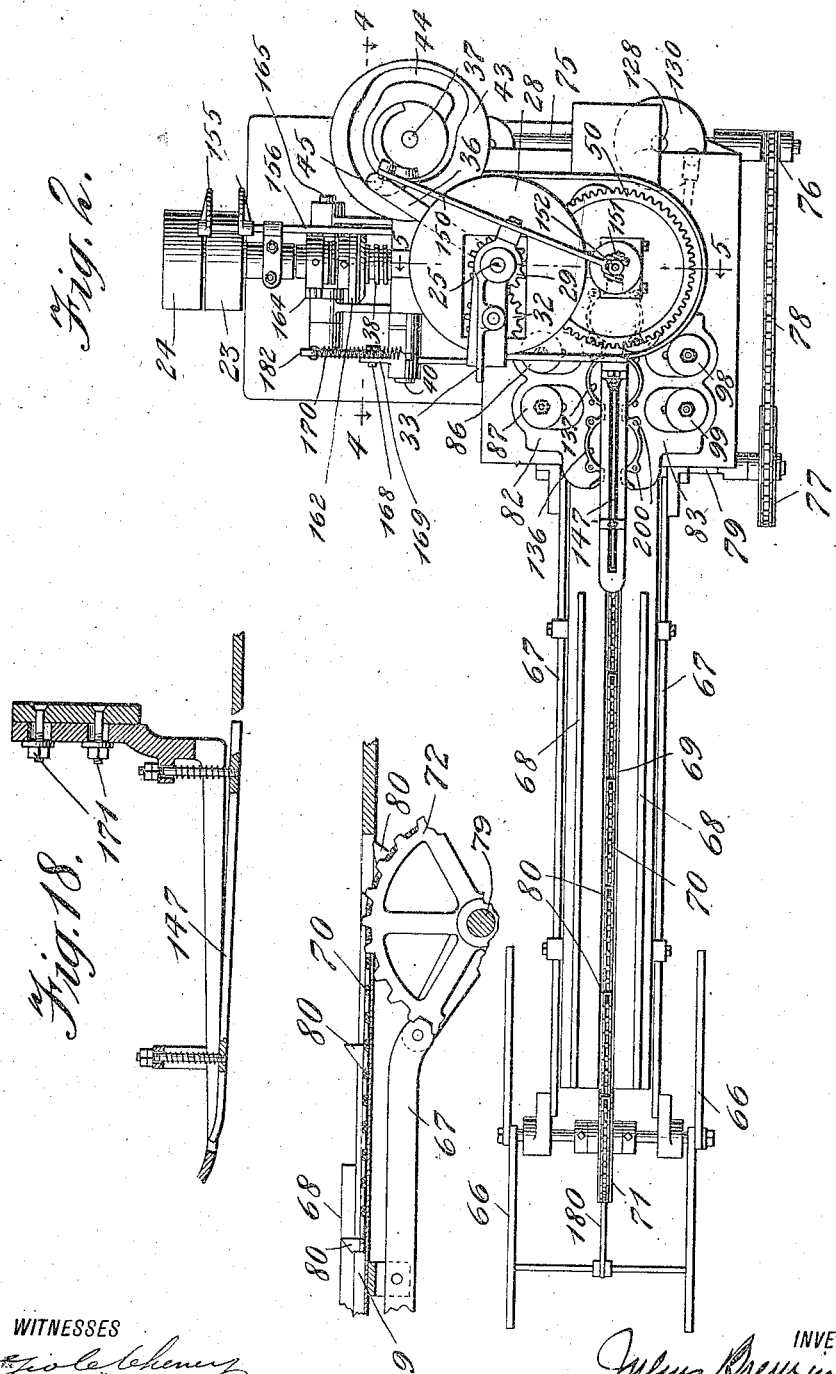
Figure 3:
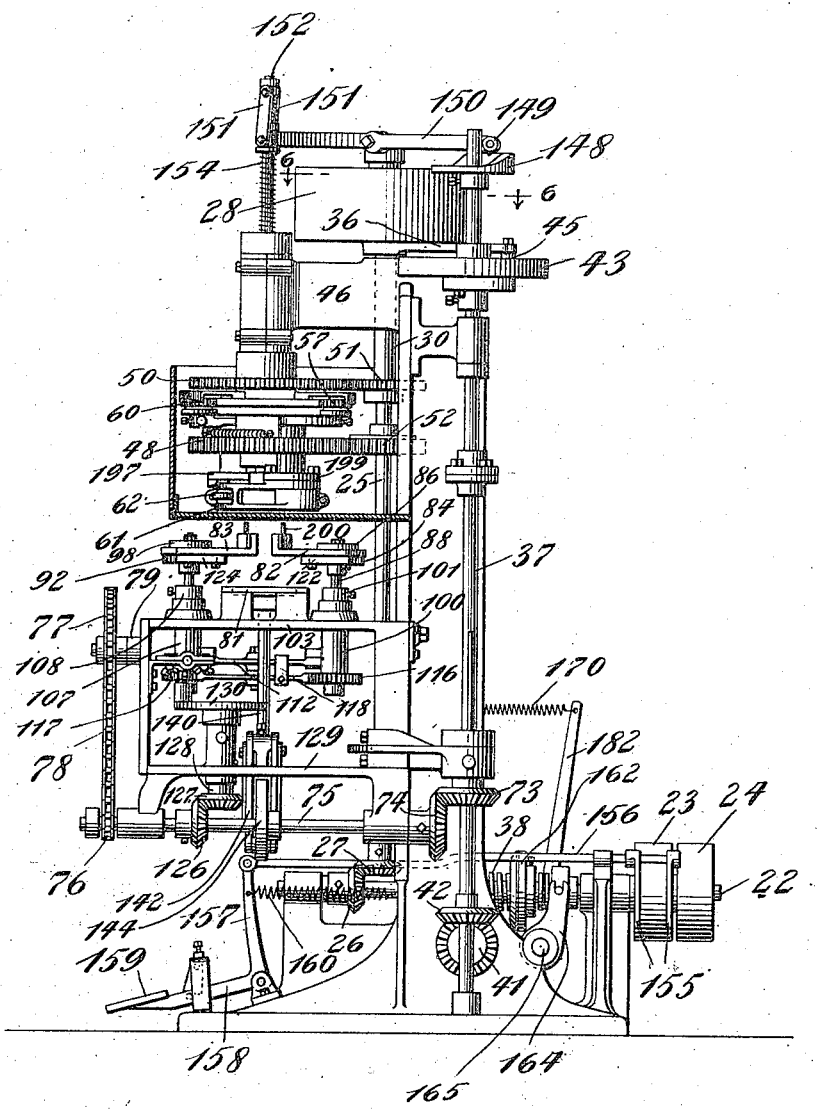
Figure 4:
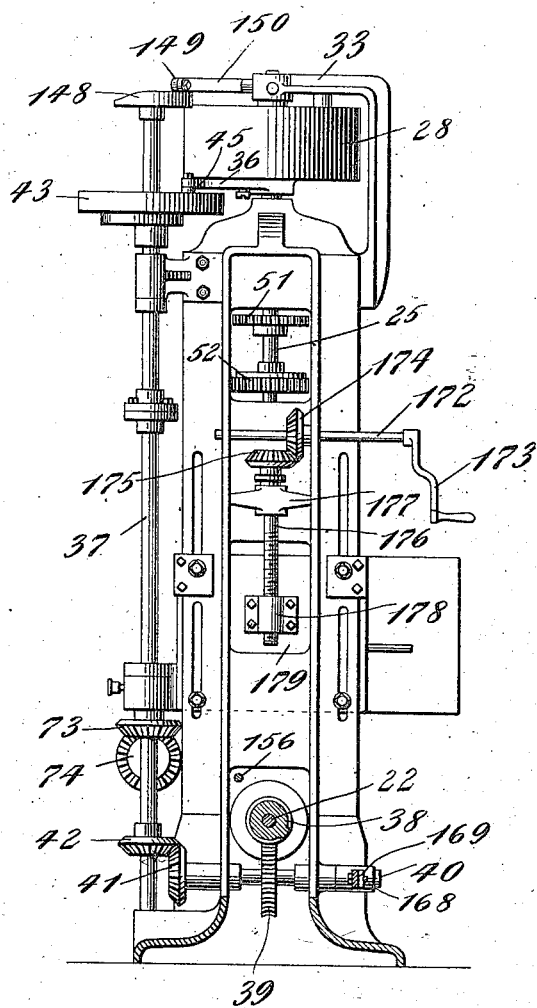
Figure 5:
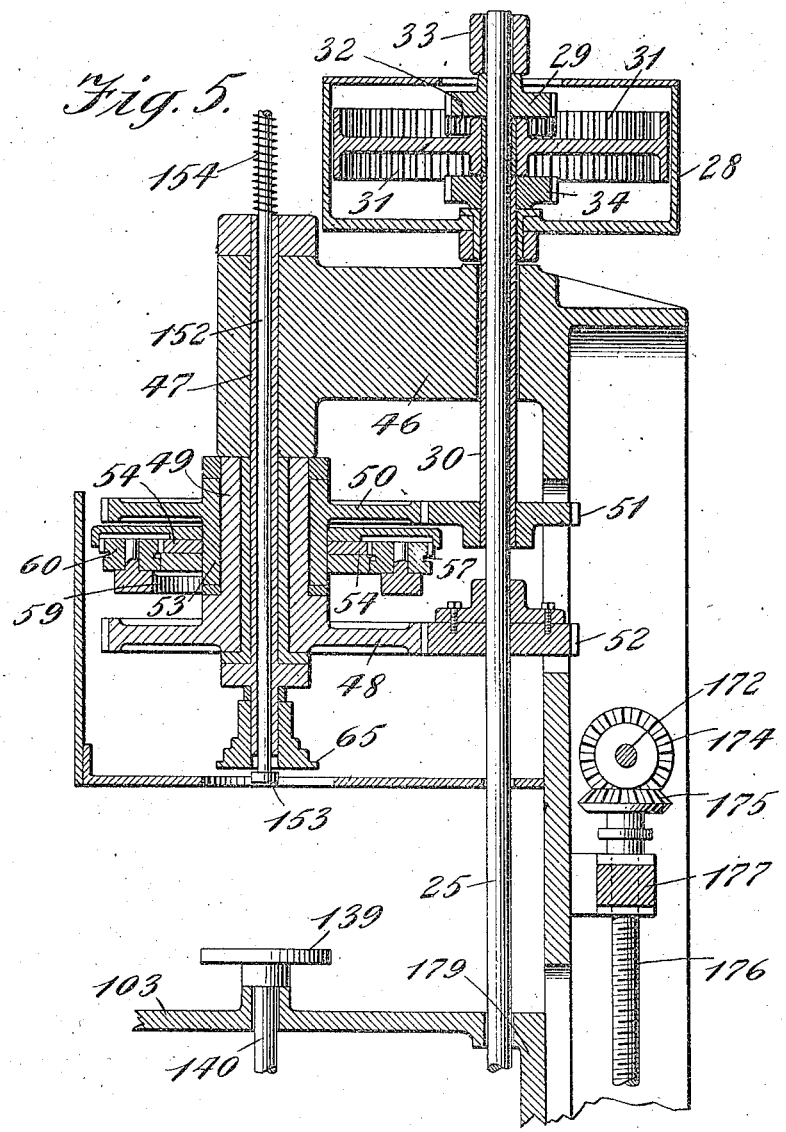
Figure 20:
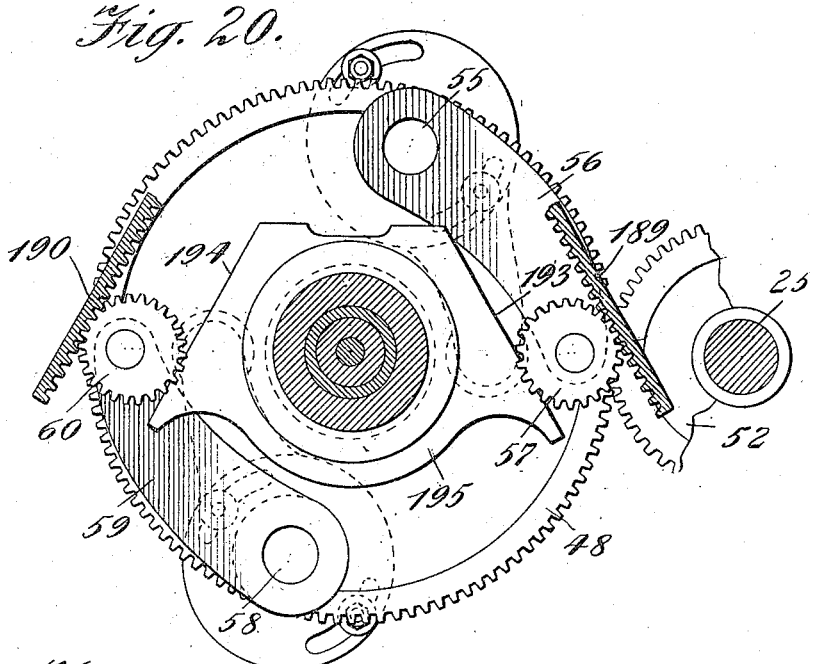
Figure 19:
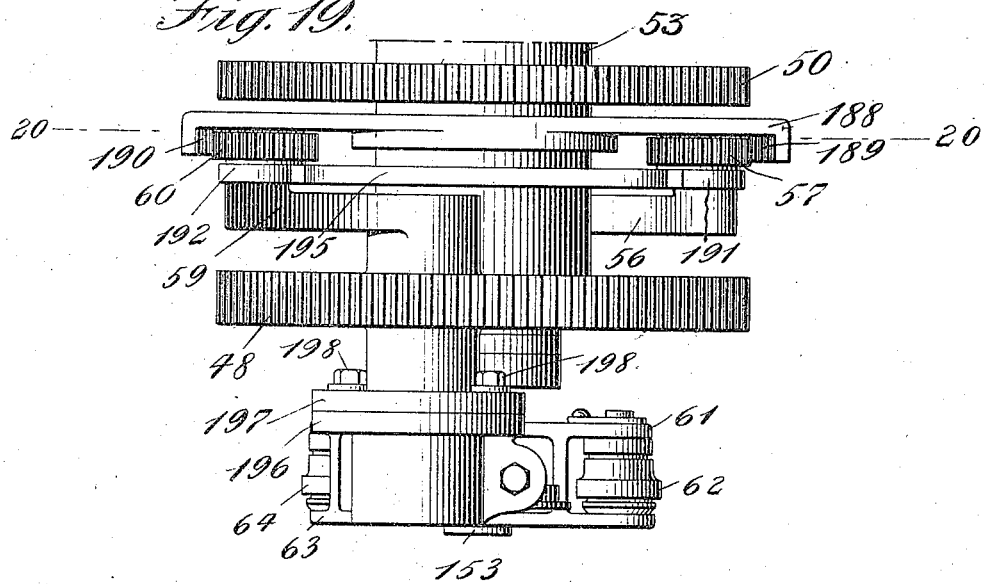

Figure 1 is a side elevation of a machine embodying my invention; Fig. 2 is a top plan view thereof; Fig. 3 is an end elevation thereof; Fig. 4 is an elevation of the side opposite to that shown in Fig. 1, with the feeding mechanism removed; Fig. 5 is an enlarged section taken substantially on the line 5—5 of Fig. 2; Fig. 6 is an enlarged section taken substantially on the line 6—6 of Fig. 3; Fig. 7 is a fragmentary section taken substantially on the line 7—7 of Fig. 6; Fig. 8 is an enlarged fragmentary elevation, partly broken away, of the seaming mechanism and the means for actuating the same; Fig. 9 is a section taken substantially on the line 9—9 of Fig. 8; Fig. 10 is a section taken substantially on the line 10—10 of Fig. 8; Fig. 11 is a similar view with parts in a different position of adjustment, as hereinafter described; Fig. 12 is a section taken substantially on the line 12—12 of Fig. 10; Fig. 13 is a sectional end elevation of the positive feeding mechanism; Fig. 14 is a top plan view of the same; Fig. 15 is a section taken substantially on the line 15—15 of Fig. 13; Fig. 16 is a section, on a reduced scale, taken substantially on the line 16—16 of Fig. 13; Fig. 17 is an enlarged sectional elevation of the lower portion of the machine, showing the main driving shaft and connections; Fig. 18 is a fragmentary elevation, partly in section, of the carrier and guard; Figs. 19 and 20 are views similar to Figs. 8 and 9 of a modification of this mechanism, Fig. 20 being a section on the line 20—20 of Fig. 19, and Figs. 21 and 22 are sectional views showing the effect of operations of the first and second seaming rollers, respectively.

Referring now to the drawings in detail, numeral 21 refers to a heavy supporting frame in the lower part of which is journaled the main driving shaft 22 which is provided with the usual fast and loose pulleys, 23 and 24, respectively, which may be connected by belt in the usual manner to any accessible and convenient source of power. Suitably journaled in the supporting frame is the vertical shaft 25, driven from the main shaft 22 by the intermeshed beveled gears 26 and 27. This vertical shaft 25 extends upwardly through the gear-box or casing 28, and carries within said box or casing the pinion 29. At the upper end of said shaft 25 is provided the sleeve or bushing 30, fixed to which, within said gear-box 28, is the double internal gear 31. Interposed between the pinion 29 and the upper portion of the internal gear 31, is the pinion 32, the axle of which is journaled in bearings in the arm 33 of the frame of the machine, the top plate of the box or casing 28 being apertured for this purpose, as best shown in Fig. 2. Keyed to the sleeve or bushing 30 is the pinion 34, identical to the pinion 29, and interposed between said pinion 34 and the lower section of the internal gear 31 is the pinion 35, the axle of which is journaled in bearings in the arm or lever 36 which is loosely mounted upon the sleeve or bushing 30.

Another vertical shaft 37 is suitably journaled in the frame of the machine, and is driven from the shaft 22 by means of the worm 38 in mesh with the gear 39 on the horizontal shaft 40, said shaft 40 being provided with a bevel gear 41 in mesh with the similar gear 42 on said shaft 37. It will be noted that the shaft 37 is in this manner rotated at a velocity much less than that of the shaft 25.

Near the top of the shaft 37 is mounted the disk 43, in the upper face of which is provided the cam groove 44. The arm 36, in which is journaled the pivot or axle of the pinion 35, carries at its end the roller 45 which projects into the cam groove 44.

It will be apparent that with the arm 36 in a position of rest, rotation of the shaft 25 will, through interposition of the pinion 32 between the pinion 29 and the internal gear 31, impart rotation to the latter, which will, through interposition of the pinion 35 between said internal gear and the pinion 34, impart rotation in the same direction and at normally the same velocity to the sleeve or bushing 30. It will be furthermore apparent, however, that if during operation bodily movement is imparted to the pinion 35, in either direction, rotation of the sleeve or bushing 30 will be retarded or accelerated, according to the direction in which said pinion 35 is moved. In order to retard the rotation of said sleeve or bushing, for a purpose which will be hereinafter made clear, and to properly time the retarding and subsequent acceleration of such movement, I provide the cam groove 44, a portion of which, as best shown in Fig. 6, is of substantially circular configuration, which during movement thereof has no effect upon the position of the arm 36. Following this circular configuration, this cam groove will be seen to diverge, whereby said arm 36 will move the pinion 35 in a direction to accelerate the transmitted motion to the pinion 34 and thereby increase the velocity of the rotating sleeve or bushing 30. Subsequently, said cam groove 44 causes the arm 36 to move in a reverse direction, thereby retarding the velocity of the rotating sleeve or bushing 30 until the circular portion of said cam groove is again reached.

The heavy arm or bracket 46 of the frame carries the vertical hollow shaft 47, upon which is rotatively mounted the gear 48 which is preferably provided with a collar 49 upon which is mounted to rotate independently thereof the gear 50. The gear 50 is in mesh with the pinion 51 keyed to the sleeve or bushing 30 on the shaft 25, and the gear 48 is in mesh with the pinion 52 keyed to the shaft 25. It will be apparent, therefore, that the gear 48 will rotate at a substantially constant velocity, while the gear 50 will rotate at a velocity which is periodically retarded and accelerated as the velocity of the gear 51 is varied in the manner described. Keyed or otherwise suitably secured to the collar 53 of the gear 50, is what may be termed the cam-gear-rack 54, the oppositely toothed faces of which are correspondingly eccentrically disposed with reference to its axis. Journaled in the gear 48 is the short shaft 55, to the upper end of which is fixed the arm 56 which carries at its end the pinion 57 in mesh with one of the racks in the cam-gear-rack 54. Similarly pivoted in the body of the gear 48 is the short shaft 58, fixed to the upper end of which is the arm 59 carrying at its end the pinion 60 in mesh with the other rack in said cam-gear-rack 54.

The shaft 55 projects through the gear 48, and at the other end thereof is mounted the arm 61 which carries at its end the seaming roller 62. Similarly, the shaft 58 projects through said gear 48 and has mounted at its lower end the arm 63 carrying the other seaming roller 64.

Mounted at the lower end of the stationary hollow shaft 47, and fixed thereon, is the chuck 65 which is adapted to enter the usual central depression in the top of the can and support the same against the action of the seaming rollers 62 and 64, the working edges of said chuck and said rollers lying in the same horizontal plane, whereby said chuck and said rollers may be brought into the usual coöperative relation through slight lateral movement of said rollers.

The effect of retarding and accelerating the velocity of the gear 50, the collar 53 of which carries the cam-gear-rack 54, in the manner described, will now be apparent. When this cam-gear-rack is made to rotate at a slightly less velocity than that of the gear 48, the pinions 57 and 60 will advance along their respective racks, the eccentric disposition of which forces the pinion 57 outwardly to slightly rock the short shaft 55 and through the arm 61 force inwardly, and into coöperative relation to the chuck, the seaming roller 62. At the same time, the relative disposition of the opposite rack permits the pinion 60 to be drawn inwardly under action of a spring 201, similarly slightly rotating the shaft 58, which through the arm 63 withdraws the seaming roller 64 from coöperative positional relation to said chuck. As the movement of said cam-gear-rack is again accelerated, the reverse of the above-described movements will be effected, the seaming roller 64 being thereby brought into, and the seaming roller 62 being withdrawn from, coöperative relation to said chuck. In Fig. 9, I have shown these parts in what may be termed mean relative positions, with both seaming rollers withdrawn from the chuck, and it will be understood, therefore, that excepting as these relative positions are varied by retarding or accellerating movement of the cam-gear-rack, both seaming-rollers and the chuck are in non-coöperative positional relation.

Supported at one end by the adjustable frame 66, and at the other by the frame of the machine, is the plate 67 on the upper face of which are provided guide-straps 68 at a proper distance apart to provide a track along which can bodies may be carried. This plate 67 is provided with an elongated slot 69 for the endless link-belt chain 70 carried by the sprocket-wheels 71 and 72, the former being suitably journaled in the frame 66 and the latter in the frame 21 of the machine. The chain 70 is driven by means of a bevel-gear 73 on the shaft 37 in mesh with a corresponding gear 74 on the horizontal shaft 75, suitably journaled in the frame of the machine, which shaft 75 carries a sprocket wheel 76 connected with the sprocket wheel 77 by the chain 78, said sprocket wheel 77 being fixed upon the short shaft 79 which carries the sprocket-wheel 72.

The link-belt 70 is provided at proper intervals with a series of teeth 80 80 projecting upwardly through the slot 69 in the track 67, and the assembled parts of the can are placed upon the track 67 one between each pair of teeth 80. The belt 70 is continuously moving, and the assembled can parts are carried by a steady movement along the track 67 and upon the platform 81, which is at the same elevation as said track 67, where the can body is in position to be engaged by the positive feeding mechanism. This positive feeding mechanism comprises what may be termed a reciprocating carriage, the operative portion of which is made up of two substantially counterpart sections 82 and 83. The section 82 is loosely supported upon the top faces of the gears 84 and 85, where it is slidably retained by means of the disks 86 and 87 secured to the shafts 88 and 89, respectively, upon which the gears 84 and 85 are journaled. These shafts 88 and 89 project through the slots 90 and 91, respectively, in the carriage-section 82, whereby movement of said section with respect to said studs is limited to that of lateral reciprocation only. The carriage section 83 similarly rests upon the upper faces of the gears 92 and 93, journaled upon the shafts 94 and 95 which project through corresponding slots 96 and 97, respectively. Corresponding retaining disks 98 and 99 slidably retain said section 83 in place.

The shaft 88 has bearings in the sleeve or bushing 100 wherein it is retained by means of the fixed collar 101. The bearing or bushing 100 is slidable in a groove 102 in the table or platform 103, suitably carried by the frame 21 of the machine, and is supported in proper position preferably by means of the ring 104 integral therewith or secured thereto, slidable in a guideway provided between the platform or table 103 and the plates 105 and 106 attached to the lower edges of longitudinal ribs on the table 103 and held at a suitable distance therefrom. Similarly, the shaft 94 is journaled in the sleeve 107 wherein it is retained by the fixed collar 108 and supported by the ring 109 thereon slidable in the guideway provided between the table 103 and the 13 plates 110 and 111 supported at a suitable distance therefrom.

The sleeves 100 and 107 are connected and braced by means of the bar 112. In a precisely similar manner, the shafts 89 and 95 are provided with bearing blocks 113 and 114, respectively, which are supported in a precisely similar manner and which are similarly slidable in the slots 102 and 115 in the table 103. These pairs of bearing blocks or sleeves 113 and 100, and 114 and 107, are interconnected by the braces 181.

At the lower end of the shaft 88 is mounted a gear 116, and at the lower end of the shaft 95 is mounted a similar gear 117. Interposed between these two gears is the member 118, preferably of the form illustrated in Fig. 15, which is pivoted to the stud 119 supported from the bar 112. Each end of the member 118 is provided with a circular rack, the rack 120 being in mesh with the gear 117 and the rack 121 being in mesh with the gear 116. The adjustment is such that when the member 118 is reciprocated about its pivot 119, the gears 116 and 117, with the shafts 88 and 95, will be alternately rotated in unison in the same direction of rotation. As has been explained, gears 84 and 85 have been provided at the upper ends of the shafts 88 and 89, respectively, whereby when said gear 116 is rotated, rotation will be imparted to said gear 84 and therefrom to the gear 85 in mesh therewith. Upon the under face of the carriage-section 82 is provided the pair of racks 122 and 123, in mesh with said gears 84 and 85, respectively. It will now be apparent that upon rotation of said gears 84 and 85, lateral movement will be imparted to said section 82 through said racks 122 and 123. Similarly, when said gear 117 is rotated, rotation will be imparted to the gear 93 at the upper end of the shaft 95, this gear imparting rotation to said gear 92 and thus imparting lateral movement to the carriage-section 83 through the racks 124 and 125 with which said section is provided.

Mounted upon the shaft 75 is the bevel gear 126 in mesh with a similar gear 127 upon the shaft 128 which is suitably journaled in the plate 129 of the machine. At the upper end of the shaft 128 is mounted the disk-wheel 130 to which is eccentrically pivoted the connecting-rod 131 which is similarly pivoted at a suitable point to the member 118. The length of the connecting rod 131 may be made adjustable by making the same of two or more parts and providing the usual right and left threaded coupling or connection 132.

It will now be apparent that as rotation is imparted by the shaft 75 to the disk-wheel 130, force will be exerted eccentrically against the member 118, the first effect of which will be to rock said member and thus impart rotation to the gears 116 and 117 in the same direction, until further movement of said member 118 is checked through contact with the adjustable stop 133 in the bar 134 which is suitably secured to the brace 112. This operation, in the manner described, has operated through the gears 84 and 85 to move the carriage-section 82 laterally in a direction away from its counterpart section 83. Similarly, rotation of the gear 117 has effected lateral movement in an opposite direction to the carriage-section 83. When further rotation of said gears is checked through the member 118 contacting with the stop 133, further movement of the connecting rod 131 will act through the member 118 against the pivot 119 to move the entire carriage mechanism longitudinally, as guided by the slots 102 and 115 in the plate 103.

Continued rotation of the disk-wheel 130 will, upon the return movement imparted to the connecting rod 131, first effect rotation of the gears 116 and 117 in a reverse direction, thereby causing the carriage-sections 82 and 83 to approach each other until said member 118 contacts with the adjustable stop 135 oppositely located in the bar 134. At this point, said member 118 again acts through the pivot 119 to return the entire carriage mechanism to its original position.

From the above it will be seen that when one of the teeth 80 in the chain 70 has carried a can body with its superposed top upon the platform 81, it is in position to be engaged between the semi-circular recesses 136 near the forward end of said carriage-sections, these recesses being intended to be of substantially the same size as the can body which is received therebetween. Operation of the carriage mechanism is so timed that lateral movement of the carriage-sections toward each other occurs immediately following the positioning of the can body upon the platform 81. Immediately thereafter, the two carriage-sections move in unison to convey a can body between the recesses 136 to the position where it will subsequently fall within the recesses 137, of similar form and size, with which said sections are provided. When this can body has been advanced one step, in this manner, the carriage-sections 82 and 83 are separated, in the manner described, and in their separated condition are returned in unison to their former position, during which operation another can body has been deposited upon the platform 81 and in position to fall between the recesses 136. The sections 82 and 83 are now again brought together, the first can body being held within the recesses 137 and the second can body within the recesses 136, and during the next forward movement of the carriage mechanism, both of these can bodies are advanced one step, the first can body being brought between the recesses 138, of similar form and size, after which the sections are again separated, another can body is delivered to the platform 81, and the advancing operation is repeated, the last operation, and subsequent operations, carrying the foremost can body upon the disk 139. With respect to this automatic feeding mechanism, taken as a whole, it will be noted that the filled cans with the top or cover in proper position thereon, are carried along the track formed by the guide-straps 68 at a slow and uniform velocity, and there is therefore little danger, during this period of transit, that any of the contents of the cans will be spilled or the covers thereon dislodged. It will be furthermore apparent that as each can reaches the platform 81, it is engaged in the manner described in the positive feeding mechanism; and, inasmuch as this mechanism is reciprocated by a connecting rod which is pivoted to a rotating body, initial movement of said feeding mechanism will be very slow, the velocity gradually increasing as said rotating body moves through an arc of 90° and then gradually diminishing during rotation of said body through the next succeeding arc of 90°, the can thus being gradually and gently brought to a stop in proper position. It will be seen, therefore, that although the feeding mechanism, as a whole, effects movement of the can bodies which is partly continuous and partly intermittent, there are no abrupt starts and stops and therefore little danger of the spilling of the contents of the can or the dislodgment of the can bodies. This disk 139 is mounted at the upper end of the vertical rod 140 which has pivotal connection with the arm 141 of a bell-crank lever, the other arm 142 of which is provided with a roller 143 in coöperative positional relation to the cam 144 on the shaft 75. The cam 144 is of such configuration and these parts are so adjusted that the disk 139, which operates through an aperture 145 in the plate 81, is raised immediately after the carriage-sections 82 and 83 have released the can body which has just been carried upon said disk 139. The can body, with the cover thereon, is raised until the latter is brought into contact with the chuck 65 on the hollow shaft 47, which chuck fits into the usual depression in the can top in a common and well-known manner to support the same against the operation of the seaming rollers. These seaming rollers are then alternately brought into play, in the manner hereinbefore described, subsequent to which the cam 144 operates to lower the disk 139, and therewith the seamed and sealed can, which is forced from its position on said disk by the next succeeding can which is being fed thereupon.

It is well known that prior to the final seaming and sealing operation, these cans are not infrequently filled with some more or less bulky food product, and must be what may be termed over-filled in order that when the cover is pressed into place the requisite weight of contents will be therein. Under such circumstances, it is ofttimes impossible to place the cover upon the filled can and retain the former in proper position for the seaming operation. I therefore prefer to provide a guide-plate 147, suitably carried upon the frame of the machine, the major portion of which is at a distance above the platform 81 and the track 67 exactly equal to the height of a can body with top in place thereon. The end of this plate 147 is gently curved upwardly so as to receive a can body without disturbing its superposed top, even though the latter may be held a slight distance above the upper edge of the can by the contents thereof. As the can is carried toward the seaming mechanism this plate 147 serves to force the top firmly down into place and hold the same in this position until delivery upon the disk 139. It is furthermore well known that when the chuck 65 has been forced into the depression in the can top, gravity is sometimes found insufficient to remove the seamed can from the chuck, and an ejecting device of some character is necessary. For the purposes of this machine, I prefer to mount at the top of the shaft 37 a cam 148 to which a roller 149 at the end of the lever 150 is in coöperative positional relation. This lever 150 is connected by means of the links 151 to the end of the vertical rod 152 which is slidable within the hollow shaft 47. At the lower end of the rod 152 is provided a disk-head 153, normally fitting within a corresponding seat or receptacle in the chuck 65. It will be apparent that the cam 148 may be of such configuration and the parts so adjusted that upon rotation of the shaft 37 the rod 152 will be depressed immediately after the seaming operation and the lowering of the disk 139, which operation will effect the dislodging of the seamed can from the chuck 65. A spring 154 serves to return said rod 152 to its normally elevated position.

Obviously, I desire to provide means for quickly stopping the machine, either when the desired work has been done or in case of accident. This I accomplish by means of the usual belt-shifter 155 at the end of the rod 156 which is pivoted to the arm 157 of a bell-crank lever suitably fulcrumed on the frame of the machine, the other arm 158 of which is provided with a treadle 159 which may be depressed to shift the belt from the fast to the loose pulley, or vice versa, and which may be retained in its normally raised position by the spring 160. But in addition to this means for stopping the whole machine, it is sometimes desirable to stop the feeding mechanism, as, for instance, when a cover or top has been dislodged as the can is being delivered to the seaming mechanism. For this purpose, I prefer to mount the worm 38 loose upon the shaft 22, adapting the same to be clamped or clutched between the member 161 fixed upon said shaft and the member 162 keyed to said shaft to rotate therewith but having longitudinal movement independent thereof. These members 161 and 162 are provided with suitable friction devices, such as the rubber plugs 163, and said member 162 is adapted to be moved longitudinally on said shaft by means of the arm 164 on the short shaft 165 in the frame of the machine and operated by means of the lever 166 pivoted on the shaft 40 and provided with a treadle 167 in a conveniently accessible location. At the end of the lever 166 is provided a pin 168 coöperating with a slot in the end of the arm 169 to reciprocate said arm 164 and thus fasten or loosen the worm 38 to or from said shaft 22. A spring 170 in tension between the frame of the machine and the arm 182 on the shaft 165, normally retains said arm 164 in one or the other of its two positions, preferably that of securing said worm to said shaft from which it is loosened by depression of the treadle 167.

In order to adapt my machine to cans of various sizes, it may be readjusted for cans of larger diameter by substituting other carriage-sections for the sections 82 and 83, the same being provided with recesses or pockets of larger diameter. It may be adjusted for cans of greater or less height through raising or lowering of the plates 147, which are adjustable by means of the screw-bolts 171, and raising or lowering of the platform 81, which I accomplish by providing a shaft 172 with a crank 173 for rotating the same, said shaft being provided with a bevel gear 174 in mesh with a corresponding gear 175 on the screw 176 having bearings in the brace 177 and threaded into the brace 178 on the plate 179, the latter being vertically slidable in suitable guideways and carrying the table 103 which, in turn, carries the platform 81. In this manner, it will be seen that the platform 81 may be adjusted for different heights of cans, and inasmuch as the shaft 79 is journaled in an adjustable and rigid frame which comprises the plate 179 and the plate 202, it will be apparent that the sprocket wheel 72 and shaft 79 will be automatically adjusted in height by the operation of adjusting the platform 81. The supporting frame 66 may be adjusted in height to correspond with the adjustment of the platform 81 by providing a cross-brace 180 pivoted to one of the uprights of said frame and having at its other end a plurality of notches to permit of the spreading apart of the lower ends of the uprights and thus raising or lowering the bearings of the sprocket-wheel 71 and the corresponding end of the platform 67. It will be apparent that the disk 139 must be made correspondingly adjustable, which I may accomplish by carrying the rod 140 down through a suitable aperture in the plate 129 and rigidly connecting the same, as by means of the set-screw 183, to the plate 184. The arm 141 of the operating lever, instead of being directly pivoted to the rod 140, is provided with a pair of links 185, which extend downwardly through the same aperture in the plate 129 and are pivoted to the plate 186, through which the rod 140 extends and between which and the plate 184 are provided the rubber buffers 187. It will be apparent that by means of the set-screw 183 the operative length of the rod 140 may be varied to suit the requirements, and it will be further apparent that through the interposition of the yielding buffers 187 I have provided for slight variations in the height of can bodies considered, generally speaking, to be of the same size, thus insuring a yielding pressure against the chuck 65.

In Figs. 19 and 20, I have shown a modification of the mechanism for causing the alternate effective operations of the seaming rollers, wherein, instead of effecting these operations through the medium of an eccentrically mounted double rack, I fix upon the collar 53 of the gear 50 the plate 188 which is provided with the racks 189 and 190. Below the gears 57 and 60, respectively, are provided the rollers 191 and 192 bearing against the inclined faces 193 and 194 of the plate 195 similarly fixed upon the collar 53. It will be apparent that in this construction, the retarding of rotation of the gear 50, with respect to rotation of the gear 48, will serve a precisely similar purpose and be of the same effect as the construction shown in Figs. 8 and 9.

Attention is directed to the fact that instead of mounting the arms 61 and 63, carrying the seaming rollers directly upon the studs or shafts 55 and 58, respectively, I may provide the arm 63 with a disk 196, loose upon the stud or shaft 58, and adapted to be secured to a corresponding disk 197 fixed upon said shaft by means of the set-screw 198. The arm 61 is similarly secured to the shaft through the interposition of the disk 199 and the counterpart of the disk 196. In this manner, the position of the seaming rollers may be made adjustable to a nicety, and I may even provide a graduated scale on one or the other of these connected disks to facilitate adjustment thereof.

I have already described the means for retaining the can tops in proper position on the can bodies as the latter are conveyed to the platform 81, and not least among the more important features of my invention, is the means for retaining the assembled can parts in proper relative position during operation of the positive feeding mechanism. It is well known that prior to the seaming operation these can tops are of greater diameter than the can bodies and each thereof projects some distance beyond the upper edge of the flanged can body. I therefore provide the sections 82 and 83 of the reciprocating carriage, with a plurality of upwardly projecting pins or posts 200, so spaced and located as to engage and retain in proper position the can top which is superposed upon the body portion engaged by the corresponding recesses 136. In this manner the can top is retained in the proper position of adjustment up to the point of its delivery to the seaming mechanism.

In Fig. 21, I have illustrated the effects of operation of the first seaming roller, and Fig. 22, the operation of the second seaming roller.

Many modifications of minor details of my improved can heading machine will doubtless readily suggest themselves to those skilled in the art to which it appertains, and I therefore do not desire to limit my invention to the specific construction herein shown and described.

I claim as new and desire to secure by Letters Patent:

1. In a can heading machine, the combination, with means for supporting the assembled parts of the can to be headed, of seaming mechanism which includes two members, means for rotating said members in unison, a seaming roller carried by one of said members out of work-engaging position when said members are rotated in unison, means for successively retarding and accelerating one of said members at intervals, and means whereby the position of said seaming roller relative to the supported can parts is varied by such retardation and acceleration.

2. In a can heading machine, the combination, with means for supporting the assembled parts of the can to be headed, of seaming mechanism which includes two members, means for rotating said members in unison, a seaming roller carried by one of said members out of work-engaging position when said members are rotating in unison, means for successively retarding and accelerating rotation of the other member at intervals, and connecting means between said last-mentioned member and said seaming roller to effect engagement between the latter and the supported can parts when rotation of the variable-speed member is retarded.

3. In a can heading machine, the combination, with means for supporting the assembled parts of the can to be headed, of seaming mechanism which includes two members, means for rotating said members in unison, a seaming roller carried by one of said members out of work-engaging position when said members are rotated in unison, means for successively retarding and accelerating rotation of one of said members at intervals, and connecting means between said seaming roller and the member not carrying the same to effect engagement between said roller and the supported can parts when the relative velocities of said members are varied by such retardation or acceleration.

4. In a can heading machine, the combination, with means for supporting the assembled parts of the can to be headed, of seaming mechanism which includes two members, means for rotating said members in unison, an arm pivoted to one of said members and carrying at its free end a seaming roller out of work-engaging position when said members are rotating in unison, means for successively retarding and accelerating one of said members at intervals, and connecting means between said arm and the member not carrying the same to oscillate said arm by said retardation and acceleration.

5. In a can heading machine, the combination, with means for supporting the assembled parts of the can to be headed, of seaming mechanism which includes two members, means for rotating said members in unison, an arm pivoted to one of said members and carrying at its free end a seaming roller out of work-engaging position when said members are rotating in unison, means for successively retarding and accelerating rotation of the other member at intervals, and connecting means between said arm and said last-mentioned member to oscillate said arm as said last-mentioned member is periodically retarded and accelerated.

6. In a can heading machine, the combination, with means for supporting the assembled parts of the can to be headed, of seaming mechanism which includes two members, means for rotating said members in unison, a plurality of seaming rollers carried by one of said members out of work-engaging positions when said members are rotated in unison, means for successively retarding and accelerating one of said members at intervals, and means whereby the position of each seaming roller in succession relative to the supported can is varied by such retardation and acceleration.

7. In a can heading machine, the combination, with means for supporting the assembled parts of the can to be headed, of seaming mechanism which includes two members, means for rotating said members in unison, a plurality of seaming rollers carried by one of said members out of work-engaging positions when said members are rotating in unison, means for successively retarding and accelerating rotation of the other member at intervals, and connecting means between said last-mentioned member and said seaming rollers to effect engagement between each roller in succession and the supported can parts when rotation of the variable-speed member is retarded.

8. In a can heading machine, the combination, with means for supporting the assembled parts of the can to be headed, of seaming mechanism which includes two members, means for rotating said members in unison, a plurality of seaming rollers carried by one of said members out of work-engaging position when said members are rotating in unison, means for successively retarding and accelerating rotation of one of said members at intervals, and connecting means between said rollers and the member not carrying the same to effect engagement between each roller successively and the supported can parts when the relative velocities of said members are varied by such retardation or acceleration.

9. In a can heading machine, the combination, with means for supporting the assembled parts of the can to be headed, of seaming mechanism which includes two members, means for rotating said members in unison, a plurality of arms pivoted to one of said members each carrying at its free end a seaming roller out of work-engaging position when said members are rotating in unison, means for successively retarding and accelerating rotation of one of said members at intervals, and connecting means between said arms and the member not carrying the same to successively oscillate said arms by said retardation and acceleration.

10. In a can heading machine, the combination, with means for supporting the assembled parts of the can to be headed, of seaming mechanism which includes two members, means for rotating said members in unison, a plurality of arms pivoted to one of said members each carrying at its free end a seaming roller out of work-engaging position when said members are rotating in unison, means for successively retarding and accelerating rotation of the other member at intervals, and connecting means between said arms and said last-mentioned member to successively oscillate said arms as said member is periodically retarded and accelerated.

11. In a can heading machine, the combination, with means for supporting the assembled parts of the can to be headed, of seaming mechanism which includes two members, means for rotating said members in unison, two arms pivoted to one of said members and each carrying at its free end a seaming roller out of work-engaging position when said members are rotating in unison, means for successively retarding and accelerating rotation of one of said members at intervals, and connecting means between said arms and the member not carrying the same to alternately oscillate said arms by such rotation and acceleration, whereby first one and then the other of said seaming rollers is brought temporarily into and out of work-engaging position.

12. In a can heading machine, the combination, with means for supporting the assembled parts of the can to be headed, of seaming mechanism which includes two members, means for rotating said members in unison, two arms pivoted to one of said members and each carrying at its free end a seaming roller out of work-engaging position when said members are rotating in unison, means for successively retarding and accelerating rotation of the other member, and connecting means between said arms and said last-mentioned member to alternately oscillate said arms to bring first one and then the other of the seaming rollers into and out of work-engaging position as movement of said last-mentioned member is retarded and accelerated.

13. In a can heading machine, the combination, with means for supporting the assembled parts of the can to be headed, seaming mechanism which includes two members, means for rotating said members in unison, and a seaming roller carried by one of said members out of work-engaging position when said members are rotating in unison, of means for successively delivering the assembled can parts to said supporting means, means automatically actuated and timed in common with said delivering means for successively retarding and accelerating movement of one of said members at intervals, and connecting means between said seaming roller and the member not carrying the same to intermittently effect engagement between said roller and the supported can parts by such retardation and acceleration.

14. In a can heading machine, the combination, with means for supporting the assembled parts of the can to be headed, seaming mechanism which includes two members, means for rotating said members in unison, and a seaming roller carried by one of said members out of work-engaging position when said members are rotating in unison, of means for successively delivering the assembled can parts to said supporting means, means automatically actuated and timed in common with said delivering means for successively retarding and accelerating movement of the other rotating member at intervals, and connecting means between said last-mentioned member and said roller to intermittently effect engagement between said roller and the supported can parts by such retardation and acceleration.

15. In a can heading machine, the combination, with means for supporting the assembled parts of the can to be headed, seaming mechanism which includes two members, means for rotating said members in unison, and a plurality of seaming rollers carried by one of said members out of work-engaging positions when said members are rotating in unison, of means for successively delivering the assembled can parts to said supporting means, means automatically actuated and timed in common with said delivering means for successively retarding and accelerating movement of one of said members at intervals, and connecting means between said rollers and the member not carrying the same to effect engagement between each roller successively and the supported can parts by such retardation and acceleration.

16. In a can heading machine, the combination, with means for supporting the assembled parts of the can to be headed, seaming mechanism which includes two members, means for rotating said members in unison, and a plurality of seaming rollers carried by one of said members out of work-engaging positions when said members are rotating in unison, of means for successively delivering the assembled can parts to said supporting means, means automatically actuated and timed in common with said delivering means for successively retarding and accelerating movement of the other rotating member at intervals, and connecting means between said last-mentioned member and said rollers to intermittently effect engagement between each roller successively and the supported can parts by such retardation and acceleration.

17. In a can heading machine, the combination, with means for supporting the assembled parts of the can to be headed, seaming mechanism which includes two members, means for rotating said members in unison, and an arm pivoted to one of said members and carrying at its free end a seaming roller out of work-engaging position when said members are rotating in unison, of means for successively delivering the assembled can parts to said supporting means, means automatically actuated and timed in common with said delivering means for successively retarding and accelerating movement of the other rotating member at intervals, and connecting means between said arm and said last-mentioned member to oscillate said arm as said member is periodically retarded and accelerated.

18. In a can heading machine, the combination, with means for supporting the assembled parts of the can to be headed, seaming mechanism which includes two members, means for rotating said members in unison and a plurality of arms pivoted to one of said members each carrying at its free end a seaming roller out of work-engaging position when said members are rotating in unison, of means for successively delivering the assembled can parts to said supporting means, means automatically actuated and timed in common with said delivering means for successively retarding and accelerating movement of the other rotating member at intervals, and connecting means between said arms and said last-mentioned member to successively oscillate said arms as said member is periodically retarded and accelerated.

19. In a can heading machine, the combination, with means for supporting the assembled parts of the can to be headed, seaming mechanism which includes two members, means for rotating said members in unison, and two arms pivoted to one of said members each carrying at its free end a seaming roller out of work-engaging position when said members are rotating in unison, of means for successively delivering the assembled can parts to said supporting means, means automatically actuated and timed in common with said delivering means for successively retarding and accelerating movement of the other rotating member at intervals, and connecting means between said arms and said last-mentioned member to alternately oscillate said arms to bring first one and then the other of said seaming rollers into work-engaging position as movement of said last-mentioned member is retarded and accelerated.

20. In a can heading machine, the combination, with means for supporting the assembled parts of the can to be headed, and means for delivering the assembled can parts successively to said supporting means, of seaming mechanism which includes two members, means for rotating said members in unison, a seaming roller carried by one of said members out of work-engaging position when said members are rotated in unison, means for successively retarding and accelerating one of said members at intervals, means whereby the position of said seaming roller relative to the supported can parts is varied by such retardation and acceleration, and means for rendering inoperative said retarding and accelerating means and checking movement of said delivering means.

21. In a can heading machine, the combination, with means for supporting the assembled parts of the can to be headed, and means for delivering the assembled can parts successively to said supporting means, of seaming mechanism which includes two members, means for rotating said members in unison, a seaming roller carried by one of said members out of work-engaging position when said members are rotating in unison, means for successively retarding and accelerating rotation of the other member at intervals, connecting means between said last-mentioned member and said seaming roller to effect engagement between the latter and the supported can parts when rotation of the variable speed member is retarded, and means for rendering inoperative said retarding and accelerating means and checking movement of said delivering means.

22. In a can heading machine, the combination, with means for supporting the assembled parts of the can to be headed, and means for delivering the assembled can parts successively to said supporting means, of seaming mechanism which includes two members, means for rotating said members in unison, a seaming roller carried by one of said members out of work-engaging position when said members are rotated in unison, means for successively retarding and accelerating rotation of one of said members at intervals, connecting means between said seaming roller and the member not carrying the same to effect engagement between said roller and the supported can parts when the relative velocities of said members are varied by such retardation or acceleration, and means for rendering inoperative said retarding and accelerating means and checking movement of said delivering means.

23. In a can heading machine, the combination, with means for supporting the assembled parts of the can to be headed, and means for delivering the assembled can parts successively to said supporting means, of seaming mechanism which includes two members, means for rotating said members in unison, an arm pivoted to one of said members and carrying at its free end a seaming roller out of work-engaging position when said members are rotating in unison, means for successively retarding and accelerating one of said members at intervals, connecting means between said arm and the member not carrying the same to oscillate said arm by said retardation and acceleration, and means for rendering inoperative said retarding and accelerating means and checking movement of said delivering means.

24. In a can heading machine, the combination, with means for supporting the assembled parts of the can to be headed, and means for delivering the assembled can parts successively to said supporting means, of seaming mechanism which includes two members, means for rotating said members in unison, an arm pivoted to one of said members and carrying at its free end a seaming roller out of work-engaging position when said members are rotating in unison, means for successively retarding and accelerating rotation of the other member at intervals, connecting means between said arm and said last-mentioned member to oscillate said arm as said last-mentioned member is periodically retarded and accelerated, and means for rendering inoperative said retarding and accelerating means and checking movement of said delivering means.

25. In a can heading machine, the combination, with means for supporting the assembled parts of the can to be headed, and means for delivering the assembled can parts successively to said supporting means, of seaming mechanism which includes two members, means for rotating said members in unison, a plurality of seaming rollers carried by one of said members out of work-engaging position when said members are rotated in unison, means for successively retarding and accelerating one of said members at intervals, means whereby the position of each seaming roller in succession relative to the supported can is varied by such retardation and acceleration, and means for rendering inoperative said retarding and accelerating means and checking movement of said delivering means.

26. In a can heading machine, the combination, with means for supporting the assembled parts of the can to be headed, and means for delivering the assembled can parts successively to said supporting means, of seaming mechanism which includes two members, means for rotating said members in unison, a plurality of seaming rollers carried by one of said members out of work-engaging position when said members are rotating in unison, means for successively retarding and accelerating rotation of the other member at intervals, connecting means between said last-mentioned member and said seaming rollers to effect engagement between each roller in succession and the supported can parts when rotation of the variable-speed member is retarded, and means for rendering inoperative said retarding and accelerating means and checking movement of said delivering means.

27. In a can heading machine, the combination, with means for supporting the assembled parts of the can to be headed, and means for delivering the assembled can parts successively to said supporting means, of seaming mechanism which includes two members, means for rotating said members in unison, a plurality of seaming rollers carried by one of said members out of work-engaging position when said members are rotating in unison, means for successively retarding and accelerating rotation of one of said members at intervals, connecting means between said rollers and the member not carrying the same to effect engagement between each roller successively and the supported can parts when the relative velocities of said members are varied by such retardation or acceleration, and means for rendering inoperative said retarding and accelerating means and checking movement of said delivering means.

28. In a can heading machine, the combination, with means for supporting the assembled parts of the can to be headed, and means for delivering the assembled can parts successively to said supporting means, of seaming mechanism which includes two members, means for rotating said members in unison, a plurality of arms pivoted to one of said members each carrying at its free end a seaming roller out of work-engaging position when said members are rotating in unison, means for successively retarding and accelerating rotation of one of said members at intervals, connecting means between said arms and the member not carrying the same to successively oscillate said arms by said retardation and acceleration, and means for rendering inoperative said retarding and accelerating means and checking movement of said delivering means.

29. In a can heading machine, the combination, with means for supporting the assembled parts of the can to be headed, and means for delivering the assembled can parts successively to said supporting means, of seaming mechanism which includes two members, means for rotating said members in unison, a plurality of arms pivoted to one of said members each carrying at its free end a seaming roller out of work-engaging position when said members are rotating in unison, means for successively retarding and accelerating rotation of the other member at intervals, connecting means between said arms and said last-mentioned member to successively oscillate said arms as said member is periodically retarded and accelerated, and means for rendering inoperative said retarding and accelerating means and checking movement of said delivering means.

30. In a can heading machine, the combination, with means for supporting the assembled parts of the can to be headed, and means for delivering the assembled can parts successively to said supporting means, of seaming mechanism which includes two members, means for rotating said members in unison, two arms pivoted to one of said members and each carrying at its free end a seaming roller out of work-engaging position when said members are rotating in unison, means for successively retarding and accelerating rotation of one of said members at intervals, connecting means between said arms a d the member not carrying the same to alternately oscillate said arms by such retardation and acceleration, whereby first one and then the other of said seaming rollers is brought temporarily into and out of work-engaging position, and means for rendering inoperative said retarding and accelerating means and checking movement of said delivering means.

31. In a can heading machine, the combination, with means for supporting the assembled parts of the can to be headed, and means for delivering the assembled can parts successively to said supporting means, of seaming mechanism which includes two members, means for rotating said members in unison, two arms pivoted to one of said members and each carrying at its free end a seaming roller out of work-engaging position when said members are rotating in unison, means for successively retarding and accelerating rotation of the other member, connecting means between said arms and said last-mentioned member to alternately oscillate said arms to bring first one and then the other of the seaming rollers into and out of work-engaging position as movement of said last-mentioned member is retarded and accelerated, and means for rendering inoperative said retarding and accelerating means and checking movement of said delivering means.

32. In a can heading machine, the combination, with means for supporting the assembled parts of the can to be headed, of seaming mechanism which includes two members, means for rotating said members in unison, an arm pivoted to one of said members and carrying at its free end a seaming roller out of work-engaging position when said members are rotating in unison, and means for successively delivering the assembled can parts to said supporting means, of means automatically actuated and timed in common with said delivering means for successively retarding and accelerating one of said members at intervals, connecting means between said arm and the variable-speed member to oscillate said arm as said member is retarded and accelerated, and means for checking movement of said delivering means and said means for retarding and accelerating one of said seaming mechanism members.

33. In a can heading machine, the combination, with means for supporting the assembled parts of the can to be headed, of seaming mechanism which includes two members, means for rotating said members in unison, an arm pivoted to one of said members and carrying at its free end a seaming roller out of work-engaging position when said members are rotating in unison, and means for successively delivering the assembled can parts to said supporting means, of means automatically actuated and timed in common with said delivering means for successively retarding and accelerating movement of the other rotating member at intervals, connecting means between said arm and said last-mentioned member to oscillate said arm as said member is retarded and accelerated, and means for checking movement of said delivering means and said means for retarding and accelerating one of said seaming mechanism members.

34. In a can heading machine, the combination, with means for supporting the assembled parts of the can to be headed, of seaming mechanism which includes two members, means for rotating said members in unison, a plurality of arms pivoted to one of said members and each carrying at its free end a seaming roller out of work-engaging position when said members are rotating in unison, and means for successively delivering the assembled can parts to said supporting means, of means automatically actuated and timed in common with said delivering means for successively retarding and accelerating one of said members at intervals, connecting means between said arms and the variable-speed member to successively oscillate said arms as said member is retarded and accelerated, and means for checking movement of said delivering means and said means for retarding and accelerating one of said seaming mechanism members.

35. In a can heading machine, the combination, with means for supporting the assembled parts of the can to be headed, of seaming mechanism which includes two members, means for rotating said members in unison, a plurality of arms pivoted to one of said members and each carrying at its free end a seaming roller out of work-engaging position when said members are rotating in unison, and means for successively delivering the assembled can parts to said supporting means, of means automatically actuated and timed in common with said delivering means for successively retarding and accelerating movement of the other rotating member at intervals, connecting means between said arms and the variable-speed member to successively oscillate said arms as said member is retarded and accelerated, and means for checking movement of said delivering means and said means for retarding and accelerating one of said seaming mechanism members.

36. In a can heading machine, the combination, with means for supporting the assembled parts of the can to be headed, of seaming mechanism which includes two members, means for rotating said members in unison, two arms pivoted to one of said members and each carrying at its free end a seaming roller out of work-engaging position when said members are rotating in unison, and means for successively delivering the assembled can parts to said supporting means, of means automatically actuated and timed in common with said delivering means for successively retarding and accelerating movement of one of said members at intervals, connecting means between said arms and the variable-speed member to alternately oscillate said arms to bring first one and then the other of said seaming rollers into work-engaging position as movement of said last-mentioned member is retarded and accelerated, and means for checking movement of said delivering means and said means for retarding and accelerating one of said seaming mechanism members.

37. In a can heading machine, the combination, with means for supporting the assembled parts of the can to be headed, of seaming mechanism which includes two members, means for rotating said members in unison, two arms pivoted to one of said members and each carrying at its free end a seaming roller out of work-engaging position when said members are rotating in unison, and means for successively delivering the assembled can parts to said supporting means, of means automatically actuated and timed in common with said delivering means for successively retarding and accelerating movement of the other rotating member at intervals, connecting means between said arms and said last-mentioned member to alternately oscillate said arms to bring first one and then the other of said seaming rollers into work-engaging position as movement of said last-mentioned member is retarded and accelerated, and means for checking movement of said delivering means and said means for retarding and accelerating one of said seaming mechanism members.

38. In a can heading machine, the combination, with the seaming mechanism, of means for successively delivering the assembled can parts thereto, which means comprise a reciprocating carriage having jaws which close to embrace a can body prior to reciprocation of said carriage in a forward direction and open to release said body after the latter has been advanced by said carriage, said jaws having rectilinear movements only, and rotary actuating means to advance and retract said carriage, said means being initially operative to close and open said jaws.

39. In a can heading machine, the combination, with the seaming mechanism, of means for successively delivering the assembled can parts thereto, which means comprise a reciprocating carriage having jaws which close to embrace a plurality of can bodies prior to reciprocation of said carriage in a forward direction and open to release said bodies after the latter have been advanced by said carriage, said jaws having rectilinear movements only, and rotary actuating means to advance and retract said carriage, said means being initially operative to close and open said jaws.

40. In a can heading machine, the combination, with the seaming mechanism, of means for successively delivering the assembled can parts thereto, which means comprise a reciprocating carriage having laterally reciprocating jaws which close to embrace a can body prior to reciprocation of said carriage in a forward direction and open to release said body after the latter has been advanced by said carriage, said jaws having rectilinear movements only, means for retaining the can parts in proper assembled condition during transit and prior to the seaming operation, a rotating element, and connecting means between said element and said carriage to advance and retract the latter, said means being initially operative to close and open said jaws.

41. In a can heading machine, the combination, with the seaming mechanism, of means for successively delivering the assembled can parts thereto, which means comprise a reciprocating carriage having laterally reciprocating jaws which close to embrace a plurality of can bodies prior to reciprocation of said carriage in a forward direction and open to release said bodies after the latter have been advanced by said carriage, said jaws having rectilinear movements only, means for retaining the can parts in proper assembled condition during transit and prior to the seaming operation, a rotating element, and connecting means between said element and said carriage to advance and retract the latter, said means being initially operative to close and open said jaws.

42. In a can heading machine, the combination, with the seaming mechanism, of means for successively delivering the assembled can parts to and positioning the same in said seaming mechanism, said means comprising a reciprocating carriage having laterally reciprocating jaws which close to embrace a can body prior to reciprocation in one direction and open to release said body prior to reciprocation in the other direction, a rotating element and a connecting rod between said element and said carriage to reciprocate the latter, said rod being connected to said carriage through mechanism for reciprocating said jaws, whereby initial movement of said rod in one direction will open and in the other direction will close said jaws prior to movement of said carriage and means for conveying said assembled can parts in procession to and successively positioning the same in said delivering means.

43. In a cam heading machine, the combination, with the seaming mechanism, of means for successively delivering the assembled can parts to and positioning the same in said seaming mechanism, said means comprising a reciprocating carriage having laterally reciprocating jaws which close to embrace a plurality of can bodies prior to reciprocation in one direction and open to release said bodies prior to reciprocation in the other direction, a rotating element and a connecting rod between said element and said carriage to reciprocate the latter, said rod being connected to said carriage through mechanism for reciprocating said jaws, whereby initial movement of said rod in one direction will open and in the other direction will close said jaws prior to movement of said carriage, and means for conveying said assembled can parts in procession to and successively positioning the same in said delivering means.

44. In a can heading machine, the combination, with means for supporting the assembled parts of the can to be headed, of two members and means for rotating said members in unison, an arm pivoted to one of said members and carrying at its free end a seaming roller out of work-engaging position when said members are rotating in unison, means for successively delivering the assembled can parts to said supporting means, means for adjusting said delivering and said supporting means to can bodies of different heights, means automatically actuated and timed in common with said delivering means to successively retard and accelerate movement of one of said members at intervals, and connecting means between said arm and the variable-speed member to oscillate said arm as said member is periodically retarded and accelerated.

45. In a can heading machine, the combination, with means for supporting the assembled parts of the can to be headed, of two members and means for rotating said members in unison, a plurality of arms pivoted to one of said members each carrying at its free end a seaming roller out of work-engaging position when said members are rotating in unison, means for successively delivering the assembled can parts to said supporting means, means for adjusting said delivering and said supporting means to can bodies of different heights, means automatically actuated and timed in common with said delivering means to successively retard and accelerate movement of one of said members at intervals, and connecting means between said arms and the variable-speed member to oscillate said arms as said member is periodically retarded and accelerated.

46. In a can heading machine, the combination, with means for supporting the assembled parts of the can to be headed, of two members and means for rotating said members in unison, an arm pivoted to one of said members and carrying at its free end a seaming roller out of work-engaging position when said members are rotating in unison, means for successively delivering the assembled can parts to said supporting means, means for adjusting said delivering and said supporting means to can bodies of different heights, means automatically actuated and timed in common with said delivering means to successively retard and accelerate movement of the member not carrying said arm, and connecting means between said arm and said last-mentioned member to oscillate said arm as said member is periodically retarded and accelerated.

47. In a can heading machine, the combination, with means for supporting the assembled parts of the can to be headed, of two members and means for rotating said members in unison, a plurality of arms pivoted to one of said members each carrying at its free end a seaming roller out of work-engaging position when said members are rotating in unison, means for successively delivering the assembled can parts to said supporting means, means for adjusting said delivering and said supporting means to can bodies of different heights, means automatically actuated and timed in common with said delivering means to successively retard and accelerate movement of the member not carrying said arms, and connecting means between said arms and said last-mentioned member to oscillate said arms as said member is periodically retarded and accelerated.

In testimony of the foregoing, I have hereunto set my hand in the presence of two witnesses.

JULIUS BRENZINGER

Witnesses:
    FRED H. BOWERSOCK,
    S. V. SMITH.

Copies of this patent may be obtained for five cents each, by addressing the "Commissioner of Patents. Washington, D. C."